(12) United States Patent
Mikliaev et al.

(10) Patent No.: US 7,782,535 B2
(45) Date of Patent: Aug. 24, 2010

(54) DEVICE FOR BEAM SHAPING

(75) Inventors: Iouri Mikliaev, Cheljabinsk (RU);
Vitalij Lissotschenko, Fröndenberg (DE); Aleksei Mikhailov, Saint Petersburg (RU); Maxim Darsht, Dortmund (DE)

(73) Assignee: Limo Patentverwaltung GmbH & Co. KG, Arnsberg (DE)

( * ) Notice: Subject to any disclaimer, the term of this patent is extended or adjusted under 35 U.S.C. 154(b) by 288 days.

(21) Appl. No.: 11/946,321

(22) Filed: Nov. 28, 2007

(65) Prior Publication Data
US 2008/0137707 A1 Jun. 12, 2008

Related U.S. Application Data

(63) Continuation of application No. PCT/EP2007/004941, filed on Jun. 4, 2007.

(30) Foreign Application Priority Data

Jun. 2, 2006 (DE) .................. 10 2006 026 321

(51) Int. Cl.
*G02B 27/10* (2006.01)
(52) U.S. Cl. ..................................... 359/623
(58) Field of Classification Search .......... 359/619–626
See application file for complete search history.

(56) References Cited
U.S. PATENT DOCUMENTS 5,251,060 A    10/1993  Uenishi et al.
5,513,201 A    4/1996   Yamaguchi et al.
5,689,521 A    11/1997  Nakata
6,471,372 B1   10/2002  Lissotschenko et al.
6,700,709 B1   3/2004   Fermann
6,975,458 B1*  12/2005  Kanzler ................. 359/571
7,027,228 B2   4/2006   Mikhailov (Continued)

FOREIGN PATENT DOCUMENTS

CN           1611969 A       5/2005

(Continued)

OTHER PUBLICATIONS

European Office Action dated Sep. 12, 2008.

(Continued)

*Primary Examiner*—Alicia M Harrington
(74) *Attorney, Agent, or Firm*—Laurence A Greenberg; Werner H Stemer; Ralph E Locher

(57) ABSTRACT

A device for beam shaping is particularly suited for producing a linear intensity distribution in a working plane. The device includes a laser light source, which can emit a multi-mode laser radiation. The beam quality factor of the radiation with regard to a first direction perpendicular to the propagation direction of the laser radiation is greater than 1 and also the beam quality factor with regard to a second direction perpendicular to the propagation direction is greater than 1. The device further includes a beam transformation assembly, which are arranged in the device in such a way that they can transform the laser radiation or partial beams of the laser radiation in such a way that the beam quality factor with regard to the first direction is increased and that the beam quality factor with regard to the second direction is reduced.

28 Claims, 4 Drawing Sheets

U.S. PATENT DOCUMENTS

2006/0291509 A1 12/2006 Mitra et al.
2007/0064754 A1 3/2007 Zheng et al.

FOREIGN PATENT DOCUMENTS

| DE | 112004000773 T5 | 8/2006 |
| --- | --- | --- |
| EP | 1006382 A1 | 6/2000 |
| EP | 1528425 A1 | 5/2005 |
| EP | 1617275 A1 | 1/2006 |
| WO | 2004100331 A1 | 11/2004 |

OTHER PUBLICATIONS

English translation of Chinese Office Action dated Oct. 30, 2009, partial translation.

* cited by examiner

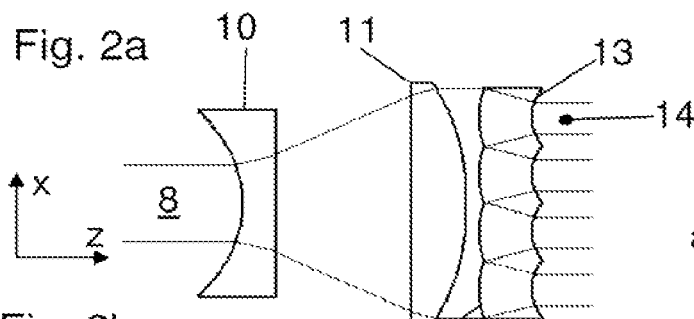
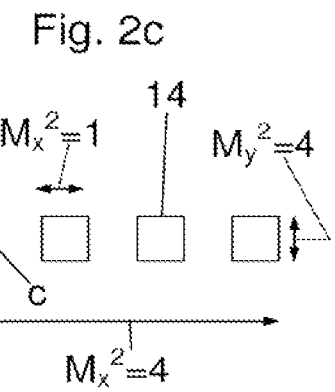
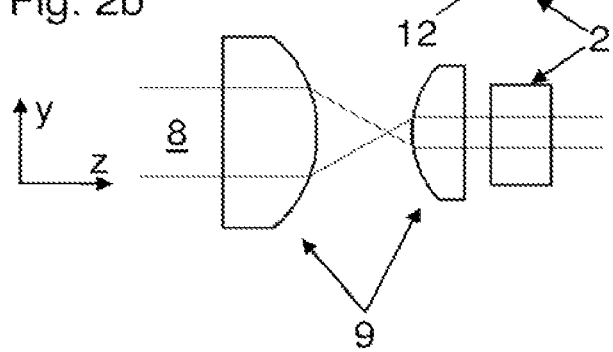
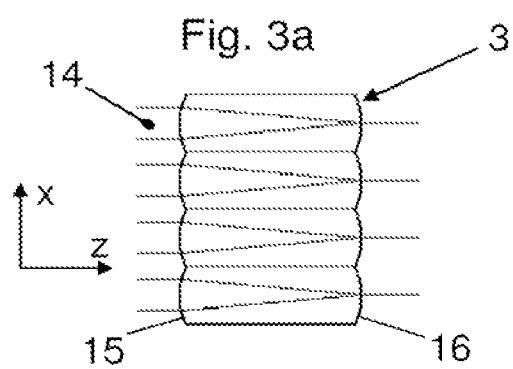
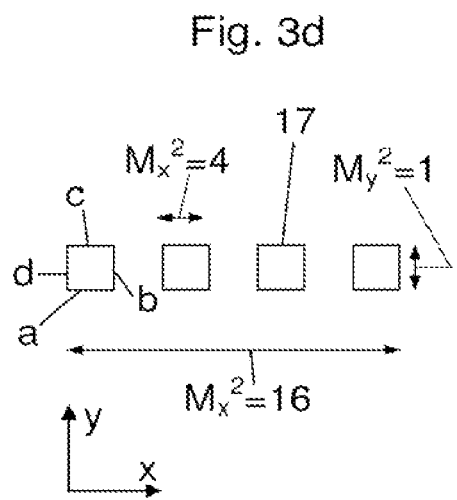
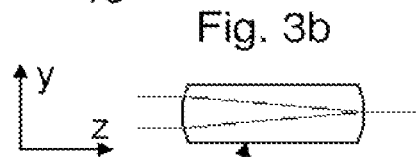
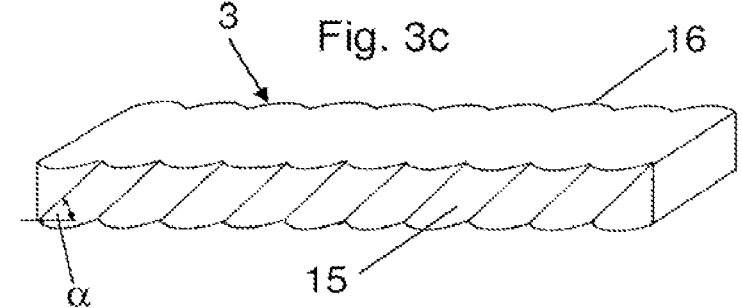
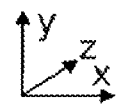

DEVICE FOR BEAM SHAPING

CROSS-REFERENCE TO RELATED APPLICATIONS

This application is a continuation, under 35 U.S.C. §120, of copending international application PCT/EP2007/004941, filed Jun. 4, 2007, which designated the United States; this application also claims the priority, under 35 U.S.C. §119, of German patent application DE 10 2006 026 321.9, filed Jun. 2, 2006; the prior applications are herewith incorporated by reference in their entirety.

BACKGROUND OF THE INVENTION

Field of the Invention

The present invention relates to a device for beam shaping, in particular for producing a linear intensity distribution in a working plane. The device has a laser light source, which can emit a multi-mode laser radiation, in the case of which the beam quality factor with regard to a first direction perpendicular to the propagation direction of the laser radiation is greater than 1 and also the beam quality factor with regard to a second direction perpendicular to the propagation direction is greater than 1.

Before delving into the description, we present the following definitions: In the propagation direction of the laser radiation means average propagation direction of the laser radiation, particularly if the latter is not a plane wave or is at least partly divergent. Light beam, partial beam or beam, unless expressly indicated otherwise, does not mean an idealized beam of geometrical optics, but rather a real light beam, such as a laser beam having a Gaussian profile or a modified Gaussian profile, for example, which does not have an infinitesimally small but rather an extended beam cross section.

Devices of the type mentioned in the introduction are quite well known. Typical laser light sources of such devices are Nd-YAG lasers or excimer lasers, for example. By way of example, Nd-YAG lasers not operated as single-mode lasers have a beam quality factor $M^2$ of approximately 8 to 25. The beam quality factor $M^2$ is a measure of the quality of the laser beam. By way of example, a laser beam having a pure Gaussian profile has a beam quality factor $M^2$ of 1. The beam quality factor $M^2$ corresponds approximately to the number of modes of the laser radiation.

The beam quality factor $M^2$ influences the focusability of the laser radiation. For a laser beam having a Gaussian profile, the thickness d or the beam waist in the focal region is proportional to the wavelength $\lambda$ of the laser beam to be focused and inversely proportional to the numerical aperture NA of the focusing lens. The following formula therefore holds true for the thickness of the laser beam in the focal region:

$$d \propto \frac{\lambda}{NA}$$

In the case of a laser beam which does not have a Gaussian profile or which has a beam quality factor $M^2$ greater than 1, the minimum thickness in the focal region or the beam waist in the focal region is additionally proportional to the beam quality factor in accordance with the following formula:

$$d \propto \frac{\lambda}{NA} \cdot M^2$$

It is therefore evident that the greater the beam quality factor, the worse laser radiation can be focused. It should be noted at this point that the beam quality factor $M^2$ can have different magnitudes with regard to two directions perpendicular to the propagation direction of the laser radiation. In this case a distinction is made between the beam quality factor $M_x^2$ with regard to a first direction, designated by x, for example, and the beam quality factor $M_y^2$ with regard to a second direction, which is designated by y, for example, and which is perpendicular to the first direction x. It is therefore entirely possible for the beam quality factor $M_x^2$ to be greater or less than the beam quality factor $M_y^2$.

It should be noted at this point that semiconductor lasers, in particular laser diode bars, have a beam quality factor $M_y^2$ of 1 or not significantly greater than 1 with regard to the so-called fast axis direction, that is to say with regard to the direction perpendicular to the active layer. With regard to the so-called slow axis direction perpendicular thereto, that is to say the direction parallel to the active layer, the beam quality factor $M_x^2$ is significantly greater, for example greater than 100. Consequently, a semiconductor laser is not regarded as a laser light source of a device of the generic type.

Furthermore, in the prior art laser radiation is homogenized regularly prior to focusing into a working plane. This is done for example by means of lens arrays having a multiplicity of lenses, such that the laser radiation is split by said lenses into a multiplicity of partial beams that are superimposed in the working plane. It is evident, however, that the number of partial beams cannot be increased arbitrarily because in the case of an excessively large number of partial beams, upon corresponding superimposition of the partial beams in the working plane, high-frequency oscillations are caused by the interference between the beams. This would lead to an impairment of the beam quality in the working plane. The criterion for the occurrence of said high-frequency oscillations is the spatial coherence of the laser radiation in a direction perpendicular to the propagation direction. The worse said spatial coherence, the greater the number of partial beams into which the light can be split without high-frequency oscillations occurring upon superimposition. Under certain circumstances, the abovementioned beam quality factor $M^2$, or $M_x^2$ or $M_y^2$, can also be an indication of the spatial coherence, such that in the case of a large beam quality factor, splitting into a large number of partial beams is possible under certain circumstances.

SUMMARY OF THE INVENTION

It is accordingly an object of the invention to provide a beam forming device, which overcomes the above-mentioned disadvantages of the heretofore-known devices and methods of this general type and which allows laser radiation to be focused better into a linear focal region and/or can be homogenized better.

With the foregoing and other objects in view there is provided, in accordance with the invention, a beam shaping device, in particular for producing a linear intensity distribution of the laser beam in a working plane. The device comprises:

a laser light source configured to emit multi-mode laser radiation with a beam quality factor with regard to a first direction perpendicular to a propagation direction of the laser radiation greater than 1 and a beam quality factor with regard to a second direction perpendicular to the propagation direction greater than 1;

beam transformation means disposed to transform the laser radiation or partial beams of the laser radiation such that the beam quality factor with regard to the first direction is increased and the beam quality factor with regard to the second direction is reduced.

In other words, the objects of the invention are achieved with a device that further comprises beam transformation means, which are arranged in the device in such a way that they can transform the laser radiation or partial beams of the laser radiation in such a way that the beam quality factor with regard to the first direction is increased and that the beam quality factor with regard to the second direction is reduced.

In this case, the beam transformation means can transform the laser radiation or partial beams of the laser radiation in such a way that the beam quality factor and/or the spatial coherence properties with regard to the first direction of the laser radiation or of each of the partial beams is or are interchanged with the beam quality factor and/or the spatial coherence properties with regard to the second direction.

It is evident that in this way the beam quality factor for one of the two directions can be significantly smaller than before the beam transformation, whereas the beam quality factor for the other of the two directions can be significantly larger after the beam transformation than before the beam transformation. The reason for this is also due to the splitting of the laser radiation into a plurality of partial beams. This splitting can be effected either in the beam transformation means or in a separate beam splitter (i.e., beam splitting means) arranged upstream of the beam transformation means. It is evident that in this case the beam quality factor can be reduced, in particular can be divided by the number of partial beams, with regard to one of the two directions perpendicular to the propagation direction.

What can be achieved by means of the device according to the invention is that the beam quality factor with regard to one direction is significantly reduced and does not become much greater than 1, wherein the beam quality factor with regard to the other direction is increased relative to the state before the beam transformation. If, however, a very thin line is to be produced by the device according to the invention in a working plane, it is important that a very good focusing onto a very small beam waist can be effected in the direction perpendicular to the longitudinal extent of the line. In the case of a very small beam quality factor with regard to this direction, a very thin linear profile can thus be obtained. In particular, a highly defined intensity distribution with a "top hat" profile can be produced in this case. The fact that in this case the beam quality factor with regard to the longitudinal extent of the line is significantly increased at the same time does not prove to be disadvantageous since no or no high degree of focusing is desired in the longitudinal direction of the line. On the contrary, as a result of the increase in the beam quality factor in the longitudinal direction of the line, in general the spatial coherence in this direction is also significantly reduced. This means, however, that lens arrays having very many lenses arranged alongside one another in this longitudinal direction can be used for homogenization without undesirable interference effects such as high-frequency oscillations occurring in the working plane. Consequently, a better homogeneity in the longitudinal direction of the line can additionally be obtained by means of the device according to the invention.

There is the possibility that the beam transformation means can rotate the laser radiation or the individual partial beams by an angle not equal to 0°, in particular 90°, about the propagation direction of the laser radiation. As an alternative to this, the beam transformation means can transform the individual partial beams in such a way that the cross section of a partial beam to be transformed is converted into a cross section which appears to be mirrored with respect to the cross section of the partial beam to be transformed at a plane parallel to the propagation direction of the laser radiation. Both embodiments of the beam transformation means make it possible to obtain an interchange of the beam quality factor with regard to the two directions perpendicular to the propagation direction.

By way of example, in this case the beam transformation means may comprise at least one cylindrical lens array, the cylinder axes of which form an angle of 45° with the first direction and the second direction. As an alternative, there is also the possibility of using two cylindrical lens arrays that are arranged one behind another and have mutually parallel or crossed cylindrical lenses, the cylinder axes of which form an angle of 45° and −45°, respectively, with the first direction and the second direction. When each of the partial beams passes through said cylindrical lens array or said cylindrical lens arrays, the partial beam is rotated by 90° or mirrored at a plane parallel to the propagation direction.

Beam transformation means of this type are known as such from the commonly assigned prior publications U.S. Pat. No. 6,471,372 B1 and its European counterpart publication EP 1 006 382 A1, from European published patent application EP 1 617 275 A1 (cf. US 2007/0053066 A1 and US 2006/0291509 A1), and from U.S. Pat. No. 7,027,228 B2 and its counterpart European patent publication EP 1 528 425 A1. However, they involve the transformation of the highly inhomogeneous laser radiation of a semiconductor laser with very small beam quality factor $M_y^2$ of the fast axis direction and very large beam quality factor $M_x^2$ of the slow axis direction in such a way that the laser radiation has a comparable beam quality in both directions after the beam transformation and corresponding collimation. In the case of the present invention, the beam transformation means known per se are utilized for the opposite effect. Laser radiation which, before the transformation, has beam quality factors $M_y^2$ and $M_x^2$, respectively, with regard to both directions which are not very different or are at least approximately equal in magnitude is transformed in such a way that after the beam transformation, the beam quality factor with regard to one of the two directions differs significantly from the beam quality factor with regard to the other of the two directions.

There is the possibility that the laser light source is embodied as an Nd-YAG laser or as an excimer laser. In this case, the Nd-YAG laser can be operated for example at the fundamental frequency or with doubled frequency, or tripled, and so on.

Other features which are considered as characteristic for the invention are set forth in the appended claims.

Although the invention is illustrated and described herein as embodied in device for beam shaping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF DRAWING

FIG. 2a shows a side view of the beam splitting means of a device according to the invention;

FIG. 2b shows a plan view of the beam splitting means in accordance with FIG. 2a;

FIG. 2c shows a cross section through the laser radiation after passing through the beam splitting means in accordance with FIG. 2a and FIG. 2b;

FIG. 3a shows a side view of the beam transformation means of the device according to the invention;

FIG. 3b shows a plan view of the beam transformation means in accordance with FIG. 3a;

FIG. 3c shows a perspective view of the beam transformation means in accordance with FIG. 3a;

FIG. 3d shows a cross section through the laser radiation after passing through the beam transformation means in accordance with FIG. 3a to FIG. 3c;

FIG. 4b shows a plan view of the beam combining means in accordance with FIG. 4a;

FIG. 5b shows a plan view of the homogenizing and focusing means in accordance with FIG. 5a;

DETAILED DESCRIPTION OF THE INVENTION

A system of Cartesian coordinates is depicted in some of the illustrations for the sake of better orientation.

Figure 1:
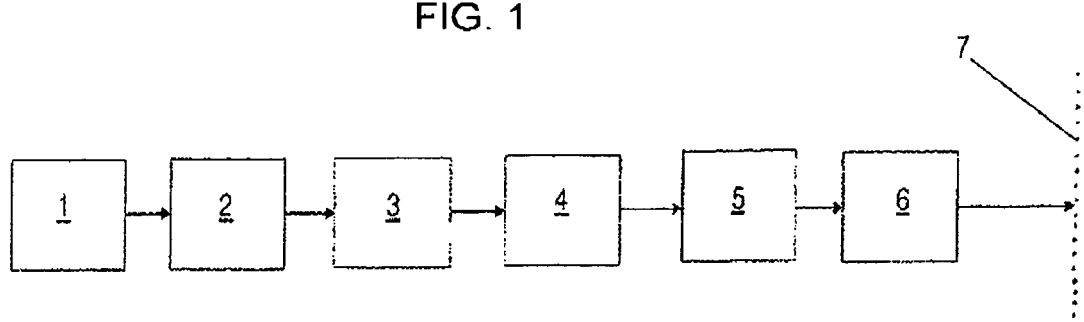
FIG. 1 shows a schematic construction of a device according to the invention.

Referring now to the figures of the drawing in detail and first, particularly, to FIG. 1 thereof, there is shown a schematic of the device according to the invention. The device comprises a laser light source 1, a beam splitter 2 (also referred to as beam splitting means 2), beam transformation means 3, beam combining means 4, homogenizing means 5, and a lens arrangement 6, which can produce a linear intensity distribution of the laser radiation in the working plane 7.

Figure 6:
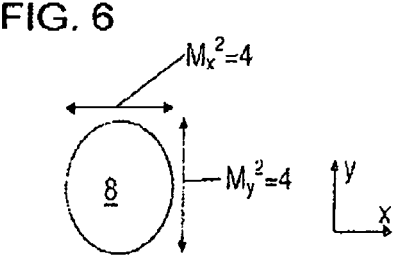
FIG. 6 shows a cross section through the laser radiation before passing through the device according to the invention.

The laser light source 1 can be formed for example as a frequency-doubled Nd-YAG laser or as an excimer laser. It is indicated in FIG. 6 that the laser radiation 8 emerging from the laser light source 1 has a circular cross section, for example. It is furthermore indicated in FIG. 6 that the laser radiation 8 has a beam quality factor $M_x^2=M_y^2=4$ both in the x direction and in the y direction.

The beam splitter 2 can be seen in detail from FIG. 2a and FIG. 2b. A telescope 9 comprising crossed two-sided cylindrical lenses 10 and 11 is disposed upstream of the beam splitter 2. The telescope 9 expands the laser radiation 8 with regard to the x direction and constricts the laser radiation 8 with regard to the y direction (in this respect, see FIG. 2a and FIG. 2b).

The beam splitter 2 are formed as a cylindrical lens array, wherein the cylinder axes of the cylindrical lens array extend in the y direction. In particular, an array of convex cylindrical surfaces 12 is provided on the entrance surface and an array of concave cylindrical surfaces 13 is provided on the exit surface of the beam splitter. What can be achieved through a corresponding choice of the focal lengths of said cylindrical surfaces and through a corresponding choice of their spacing is that four partial beams 14 spaced apart from one another in the x direction emerge from the beam splitter 2. FIG. 2c shows that said partial beams 14 have a square cross section.

It is entirely possible to provide more or fewer than four cylindrical surfaces 12, 13, such that more or fewer than four partial beams 14 arise. By way of example, eight or thirteen cylindrical surfaces 12, 13 can be provided.

FIG. 2c furthermore reveals that each individual one of the partial beams 14 has a beam quality factor $M_x^2=1$ in the x direction and a beam quality factor $M_y^2=4$ in the y direction. Overall, therefore, a beam quality factor $M_x^2=4$ results for the x direction for all four partial beams 14 together.

The laser radiation split into individual partial beams 14 in this way enters into the beam transformation means 3, which can be seen from FIG. 3a to FIG. 3c. The beam transformation means 3 likewise comprise a cylindrical lens array with an array of convex cylindrical surfaces 15 on the entrance surface and an array of convex cylindrical surfaces 16 on the exit surface of the beam transformation means 3. In this case, the cylinder axes of the cylindrical surfaces 15, 16 are inclined at an angle α=45° with respect to the y direction and with respect to the x direction, respectively. When passing through the beam transformation means 3, the individual partial beams 14 are transformed in such a way that they appear to be mirrored at a plane parallel to the propagation direction z. FIG. 2c and FIG. 3d indicate how the partial beams 14 are converted into transformed partial beams 17. In this case, the left-hand partial beam 14 in FIG. 2c and the left-hand partial beam 17 in FIG. 3d are each provided with a letter a, b, c, d on each of their sides. It is evident that an interchange of said letters a, b, c, d takes place according to a pattern corresponding to a mirroring at a diagonal area of these partial beams 14, 17. This transformation could also be designated as a rotation about the z direction by 90° with subsequent interchange of the sides a, c.

It can be seen from FIG. 3d that the beam quality factor of the partial beams 17 is different from that of the partial beams 14. In particular, in the case of each of the partial beams 17, the beam quality factor $M_x^2$ is equal to 4 for the x direction and the beam quality factor $M_y^2$ is equal to 1 for the y direction. Overall, therefore, a beam quality factor $M_x^2$ equal to 16 results for the x direction for all four partial beams 17 together.

After passing through the beam transformation means 3, the individual partial beams 17 impinge on the beam combining means 4. The beam combining means 4 are formed in a manner corresponding to the beam splitter 2 by an array of concave cylindrical surfaces 18 on the entrance surface and an array of convex cylindrical surfaces 19 on the exit surface of the beam combining means 4. A further telescope 20 is introduced into the beam path downstream of the beam combining means 4, which telescope expands the beam in the y direction by means of correspondingly arranged cylindrical lenses 21, 22.

Figure 4A:
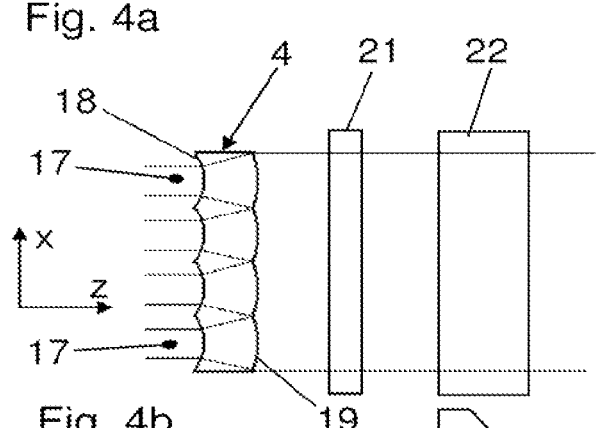
FIG. 4a shows a side view of beam combining means of the device according to the invention.
Figure 4B:
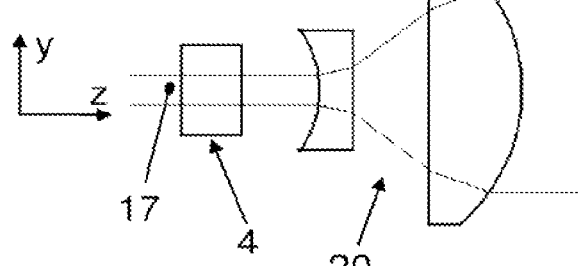
Figure 4C:
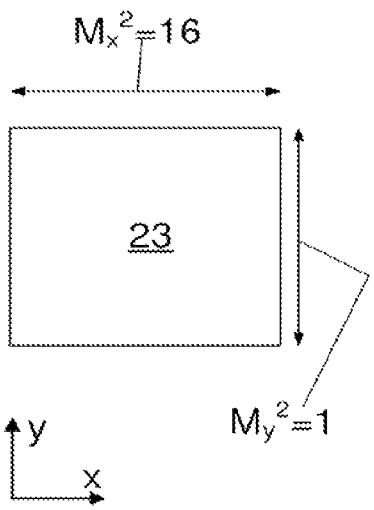
FIG. 4c shows a cross section through the laser radiation after passing through the beam combining means in accordance with FIG. 4a and FIG. 4b.

FIG. 4C shows the cross section of laser radiation 23 after passing through the beam combining means 4 and the telescope 20. It is evident that the laser radiation 23 is an individual laser beam having a square cross section. In particular, in this case the beam quality factor $M_x^2$ is equal to 16 for the x direction and the beam quality factor $M_y^2$ is equal to 1 for the y direction.

Figure 5A:
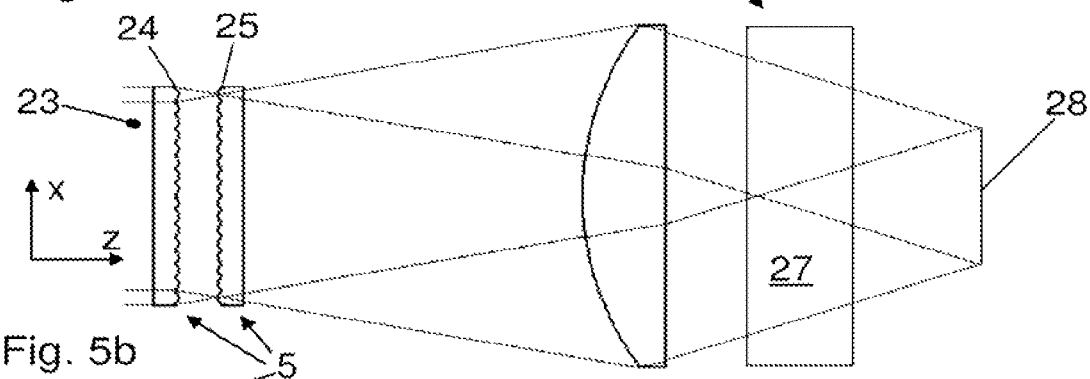
FIG. 5a shows a side view of homogenizing and focusing means of the device according to the invention.
Figure 5B:
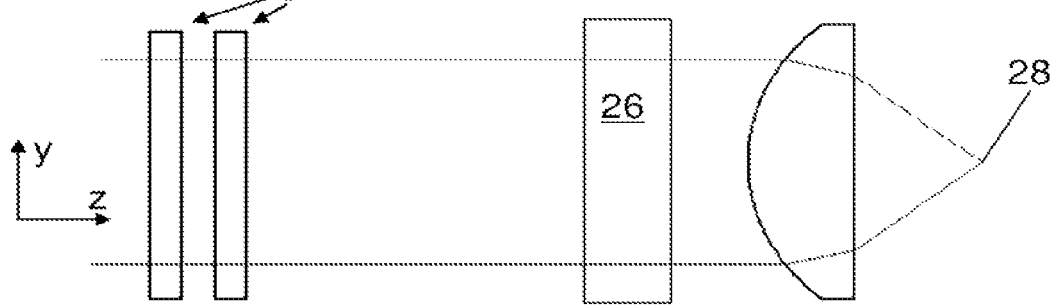

This laser radiation 23 passes through the homogenizing means 5 (see FIG. 5a and FIG. 5b) formed as two arrays of cylindrical lenses 24, 25 arranged one behind the other. In this case, the arrays of cylindrical lenses 24, 25 are arranged approximately at the spacing of the focal length of the cylindrical lenses in the z direction with respect to one another. On account of the beam transformation and the associated increase in the beam quality factor Mx2 from 4 to 16, up to 16 cylindrical lenses 24, 25 can be arranged alongside one another in the x direction without undesirable interference effects occurring in the working plane 7.

After passing through the homogenizing means 5, the laser radiation passes through the lens arrangement 6, which is formed as two cylindrical lenses 26, 27 spaced apart from one another, wherein the cylinder axis of the cylindrical lens 26 extends in the y direction and the cylinder axis of the cylindrical lens 27 extends in the x direction. The lens arrangement 6 not only focuses the laser radiation in such a way that a linear intensity distribution 28 arises in the working plane 7 (see FIG. 7), but also superimposes in the working plane 7 individual parts of the laser radiation which propagate in different and/or identical directions on account of the cylindrical lenses 24, 25. This is the principle known per se for homogenization with cylindrical lens arrays and downstream lenses which serve as field lenses and superimpose the laser radiation in a working plane. The lens arrangement 6 therefore serves as focusing means and contributes to the homogenization.

Figure 7:
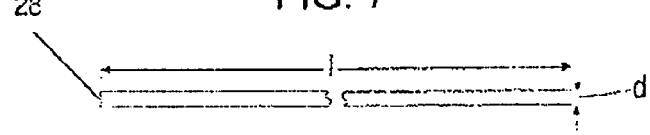
FIG. 7 shows a cross section through the laser radiation in the working plane or after passing through the device according to the invention.

The linear intensity distribution 28 in the working plane 7 can be seen by way of example from FIG. 7. In this case, said linear intensity distribution 28 is illustrated schematically and can have a length l of between 10 mm and 1000 mm, for example of approximately 100 mm, and a thickness d of between 1 μm and 100 μm, for example of approximately 10 μm. It is evident, therefore, that a focal region with a very small thickness and, if appropriate, also a relatively large depth of focus can be produced with the device according to the invention even when a multi-mode laser light source is used. It is entirely possible for the thickness of the intensity distribution 28 to be made less than 10 μm. This is dependent, for example, on the numerical aperture of the lens used.

In the Y direction, that is to say perpendicular to the longitudinal extent of the linear intensity distribution 28, the laser radiation can have a Gaussian distribution or a top hat distribution or any other distribution.

Figure 8:
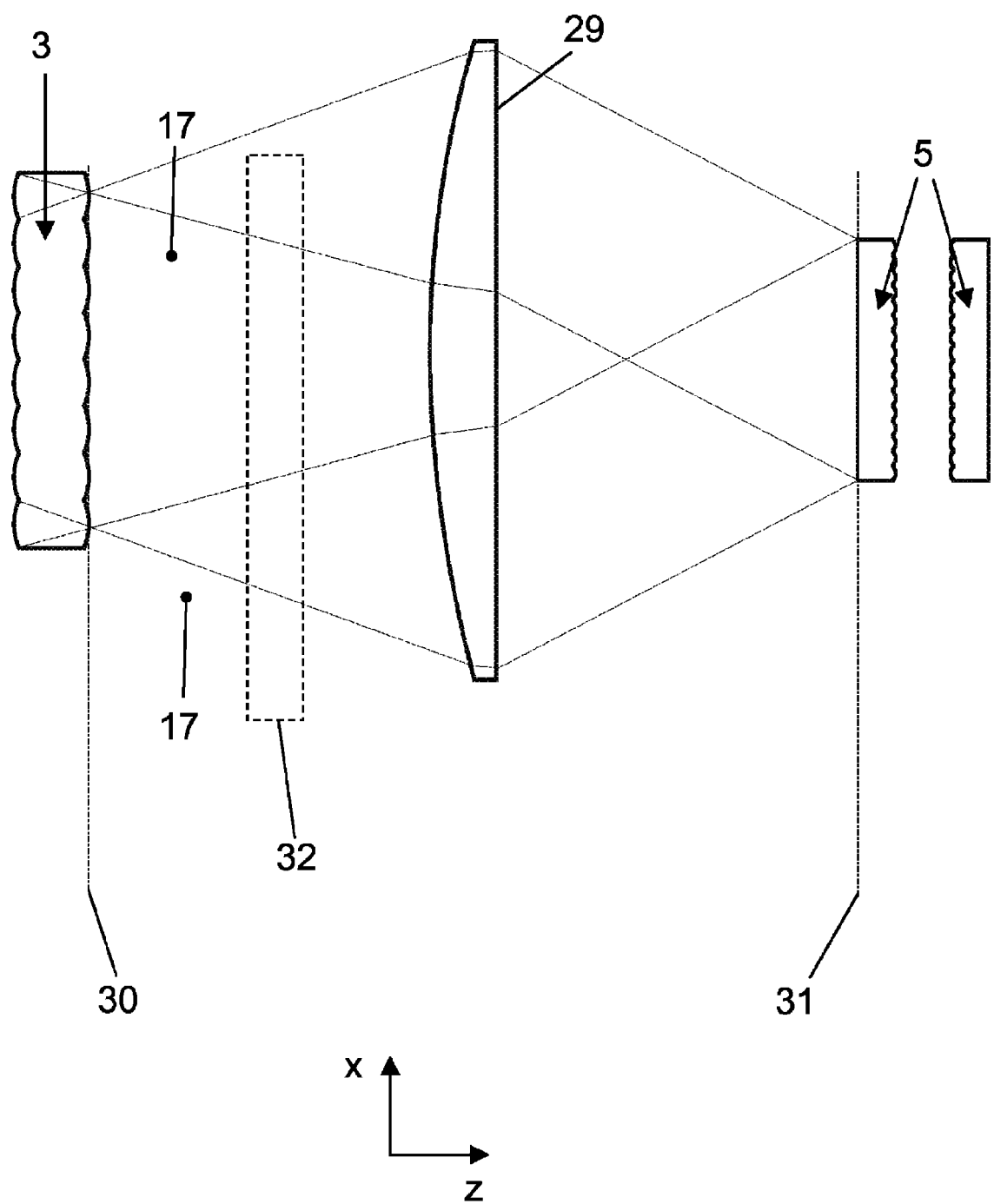
FIG. 8 shows a side view of beam transformation means, homogenizing means and a second embodiment of beam combining means of the device according to the invention.

FIG. 8 shows a further embodiment of the beam combining means. These beam combining means comprise lens means 29 serving as a Fourier lens or Fourier lenses. This means that the output plane 30 of the beam transformation means 3 is arranged in the input-side Fourier plane or focal plane of the lens means 29, and that the input plane 31 of the homogenizing means 5 is arranged in the output-side Fourier plane or focal plane of the lens means 29. A Fourier transformation of the intensity distribution in the output plane 30 of the beam transformation means 3 into the input plane 31 of the homogenizing means 5 therefore takes place.

The individual partial beams 17, two of which are depicted in FIG. 8, are simultaneously superimposed with one another in the input plane 31 of the homogenizing means 5. Owing to the fact that in this case each of the individual partial beams 17 is incident in the input plane 31 from a different direction, the number of cylindrical lenses 24, 25 of the homogenizing means 5 can be reduced, in particular by a factor corresponding to the number of partial beams 17 and thus to the number of cylindrical surfaces 16 of the beam transformation means 3.

The lens means 29 can be formed as an individual lens or as a plurality of lenses. If the lens means 29 are formed by a plurality of lenses, the latter are arranged in the device in such a way that the output plane 30 of the beam transformation means 3 is arranged in the input-side system focal plane of the lens means 29, and that the input plane 31 of the homogenizing means 5 is arranged in the output-side system focal plane of the lens means 29.

Furthermore, the lens or lenses of the lens means 29 can be formed as cylindrical lens whose cylinder axis extends in the Y direction.

Lens means 32 for collimating the laser radiation with regard to the Y direction are depicted by dashed lines in FIG. 8. Said lens means 32 are optional and can be arranged between the beam transformation means 3 and the lens means 29. The lens means 32 can be formed as an individual lens or as a plurality of lenses. Furthermore, the lens or lenses of the lens means 32 can be formed as cylindrical lens whose cylinder axis extends in the X direction.

The invention claimed is:

1. A beam shaping device, comprising:
   a laser light source configured to emit multi-mode laser radiation with a beam quality factor with regard to a first direction perpendicular to a propagation direction of the laser radiation greater than 1 and a beam quality factor with regard to a second direction perpendicular to the propagation direction greater than 1; and
   beam transformation means disposed to transform the laser radiation or partial beams of the laser radiation such that the beam quality factor with regard to the first direction is increased and the beam quality factor with regard to the second direction is reduced, said beam transformation means configured to rotate the laser radiation or the individual partial beams by an angle different from 0° about the propagation direction of the laser radiation;
   wherein said laser light source is not a semiconductor laser.

2. The device according to claim 1, configured to produce a linear intensity distribution of the laser beam in a working plane.

3. The device according to claim 1, wherein said beam transformation means are configured to transform the laser radiation or partial beams of the laser radiation such that the beam quality factor and/or spatial coherence properties with regard to the first direction of the laser radiation or of each of the partial beams is interchanged with the beam quality factor and/or the spatial coherence properties with regard to the second direction.

4. The device according to claim 3, wherein said beam transformation means are configured to transform the laser radiation or the individual partial beams such that a cross section of a partial beam to be transformed is converted into a cross section that appears to be mirrored with respect to the cross section of the partial beam to be transformed at a plane parallel to the propagation direction of the laser radiation.

5. The device according to claim 1, wherein said beam transformation means are configured to rotate the laser radiation or the individual partial beams by an angle of 90° about the propagation direction of the laser radiation.

6. The device according to claim 1, wherein said beam transformation means comprise at least one cylindrical lens array having cylinder axes enclosing an angle of 45° with the first direction and with the second direction.

7. The device according to claim 1, which comprises a beam splitter for splitting the laser radiation into a plurality of partial beams.

8. The device according to claim 7, wherein said beam transformation means are disposed downstream of said beam splitter in the propagation direction of the laser radiation.

9. The device according to claim 7, wherein said beam splitter forms a part of said beam transformation means.

10. The device according to claim 7, wherein said beam splitter includes at least one cylindrical lens array.

11. The device according to claim 1, which further comprises focusing means for focusing the laser radiation into a working plane.

12. The device according to claim 11, which comprises a lens arrangement configured to contribute in focusing and/or homogenizing the laser radiation.

13. The device according to claim 1, which further comprises homogenizing means for homogenizing the laser radiation.

14. The device according to claim 13, wherein said homogenizing means comprise at least one cylindrical lens array.

15. The device according to claim 1, wherein the laser radiation of the laser light source, prior to beam transformation, has a beam quality factor greater than 2 with regard to the first direction perpendicular to the propagation direction of the laser radiation, and a beam quality factor greater than 2 with regard to the second direction perpendicular to the propagation direction.

16. The device according to claim 15, wherein the beam quality factor with regard to the first direction is greater than 4 and the beam quality factor with regard to the second direction is greater than 4.

17. The device according to claim 15, wherein the beam quality factor with regard to the first direction is greater than 6 and the beam quality factor with regard to the second direction is greater than 6.

18. The device according to claim 1, wherein the laser radiation of the laser light source, prior to beam transformation, has a beam quality factor with regard to the first direction perpendicular to the propagation direction of the laser radiation at most ten times larger than a beam quality factor with regard to the second direction perpendicular to the propagation direction.

19. The device according to claim 18, wherein the beam quality factor with regard to the first direction is no more than five times larger than the beam quality factor with regard to the second direction.

20. The device according to claim 19, wherein the beam quality factor with regard to the first direction is no more than twice as large as the beam quality factor with regard to the second direction.

21. The device according to claim 1, wherein the laser radiation of the laser light source, prior to beam transformation, has a beam quality factor with regard to the first direction perpendicular to the propagation direction of the laser radiation equal to a beam quality factor with regard to the second direction perpendicular to the propagation direction.

22. The device according to claim 1, wherein said laser light source is a laser selected from the group consisting of an Nd-YAG laser and an excimer laser.

23. A beam shaping device, comprising:

a laser light source configured to emit multi-mode laser radiation with a beam quality factor with regard to a first direction perpendicular to a propagation direction of the laser radiation greater than 1 and a beam quality factor with regard to a second direction perpendicular to the propagation direction greater than 1;

beam transformation means disposed to transform the laser radiation or partial beams of the laser radiation such that the beam quality factor with regard to the first direction is increased and the beam quality factor with regard to the second direction is reduced; and beam combining means disposed to combine the individual partial beams after the transformation by said beam transformation means;

said beam combining means including at least one cylindrical lens array; and said beam combining means including lens means arranged downstream of said beam transformation means and configured to effect a Fourier transformation of an intensity distribution of the laser radiation emerging from said beam transformation means.

24. The device according to claim 23, which further comprises homogenizing means for homogenizing the laser radiation, and wherein said lens means are disposed between said beam transformation means and said homogenizing means for effecting a Fourier transformation of an intensity distribution of the laser radiation in an output plane of said beam transformation means into an input plane of said homogenizing means.

25. The device according to claim 23, wherein said lens means are disposed downstream of said beam transformation means for superimposing the individual partial beams emerging from said beam transformation means.

26. The device according to claim 25, wherein said lens means are disposed to superimpose in an input plane of said homogenizing means.

27. The device according to claim 23, wherein said lens means comprise one or a plurality of lenses.

28. The device according to claim 27, wherein said lens or lenses are cylindrical lenses.

* * * * *

UNITED STATES PATENT AND TRADEMARK OFFICE
CERTIFICATE OF CORRECTION

PATENT NO.         : 7,782,535 B2
APPLICATION NO.    : 11/946321
DATED              : August 24, 2010
INVENTOR(S)        : Iouri Mikliaev et al.

It is certified that error appears in the above-identified patent and that said Letters Patent is hereby corrected as shown below:

Title page, Item 73 should read as follows:

Item (73)    Assignee:   LIMO Patentverwaltung GmbH & Co. KG

Gerstengrund (D)

Signed and Sealed this

Sixteenth Day of November, 2010

David J. Kappos
*Director of the United States Patent and Trademark Office*